(12) United States Patent
Liu et al.

(10) Patent No.: US 8,086,909 B1
(45) Date of Patent: Dec. 27, 2011

(54) AUTOMATIC CORE FILE UPLOAD

(75) Inventors: Joshua Liu, Los Angeles, CA (US); Michael Eric Powers, San Jose, CA (US); Sabina Ulyanchenko, San Jose, CA (US); Pradeep Kaira, San Jose, CA (US); Sam Varghese, Cupertino, CA (US); Michael Kaplunov, San Jose, CA (US); Ganesh Ragavan Narayanan, Sunnyvale, CA (US); Muthukumar Ratty, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 307 days.

(21) Appl. No.: 12/265,362

(22) Filed: Nov. 5, 2008

(51) Int. Cl.
*G06F 11/00* (2006.01)

(52) U.S. Cl. ........... 714/49; 714/11; 714/34; 714/37; 714/39; 714/27; 714/46

(58) Field of Classification Search ........... 714/27, 714/37, 39, 46
See application file for complete search history.

(56) References Cited

U.S. PATENT DOCUMENTS

| | | | |
|---|---|---|---|
| 5,768,528 A | 6/1998 | Stumm | |
| 6,226,761 B1 * | 5/2001 | Berstis | 714/37 |
| 6,370,582 B1 | 4/2002 | Lim et al. | |
| 6,381,709 B1 | 4/2002 | Casagrande et al. | |
| 6,393,386 B1 * | 5/2002 | Zager et al. | 703/25 |
| 6,615,383 B1 | 9/2003 | Talluri et al. | |
| 6,678,835 B1 * | 1/2004 | Shah et al. | 714/4 |
| 6,711,612 B1 | 3/2004 | Blumenau et al. | |
| 6,728,897 B1 | 4/2004 | Cramer et al. | |
| 6,738,928 B1 * | 5/2004 | Brown | 714/26 |
| 6,741,554 B2 | 5/2004 | D'Amico et al. | |
| 6,859,462 B1 | 2/2005 | Mahoney et al. | |
| 6,973,491 B1 * | 12/2005 | Staveley et al. | 709/224 |
| 7,013,419 B2 | 3/2006 | Kagan et al. | |
| 7,039,828 B1 | 5/2006 | Scott | |
| 7,051,050 B2 | 5/2006 | Chen et al. | |
| 7,117,303 B1 | 10/2006 | Zayas et al. | |
| 7,263,632 B2 * | 8/2007 | Ritz et al. | 714/25 |
| 7,266,717 B2 | 9/2007 | Cassell et al. | |
| 7,321,982 B2 | 1/2008 | Coatney et al. | |
| 7,657,815 B2 | 2/2010 | Seidel et al. | |

(Continued)

FOREIGN PATENT DOCUMENTS

WO WO 03005200 A1 * 1/2003

OTHER PUBLICATIONS

Leung, "Improving the CUstomer Support Experience with NetApp Remote Support Agent", Apr. 2008, NetApp, p. 1-10.*

(Continued)

*Primary Examiner* — Robert Beausoliel, Jr.
*Assistant Examiner* — Jeison C Arcos
(74) *Attorney, Agent, or Firm* — Blakely, Sokoloff, Taylor & Zafman LLP

(57) ABSTRACT

A support center receives an error message from a remote storage system indicating that an error, such as a kernel panic, has occurred on the remote storage system. The error message is processed to determine the type of error, whether the type of error is known and whether a solution is known for the type of error. If the type of error is unknown, a core file upload request is automatically generated and sent to the remote storage system.

21 Claims, 4 Drawing Sheets

U.S. PATENT DOCUMENTS

| | | | |
|---|---|---|---|
| 7,693,070 | B2 | 4/2010 | Rider et al. |
| 7,783,930 | B2 | 8/2010 | Gilge |
| 7,783,932 | B1* | 8/2010 | Eigen et al. ............ 714/45 |
| 2002/0032884 | A1 | 3/2002 | Kobata et al. |
| 2002/0116593 | A1 | 8/2002 | Kazar et al. |
| 2002/0194320 | A1* | 12/2002 | Collins et al. ............ 709/223 |
| 2003/0005362 | A1* | 1/2003 | Miller et al. ............ 714/27 |
| 2003/0033308 | A1 | 2/2003 | Patel et al. |
| 2003/0135622 | A1 | 7/2003 | Anderson et al. |
| 2003/0169687 | A1 | 9/2003 | Bardini et al. |
| 2004/0205397 | A1* | 10/2004 | Rajiv et al. ............ 714/25 |
| 2005/0114401 | A1* | 5/2005 | Conkel ............ 707/200 |
| 2005/0120273 | A1* | 6/2005 | Hudson et al. ............ 714/38 |
| 2005/0242948 | A1 | 11/2005 | Tarr |
| 2006/0112219 | A1* | 5/2006 | Chawla et al. ............ 711/114 |
| 2006/0168172 | A1 | 7/2006 | Kumaran |
| 2006/0179188 | A1 | 8/2006 | Mimatsu et al. |
| 2006/0200471 | A1 | 9/2006 | Holland et al. |
| 2006/0293942 | A1* | 12/2006 | Chaddha et al. ............ 705/8 |
| 2007/0033281 | A1* | 2/2007 | Hwang et al. ............ 709/224 |
| 2007/0143827 | A1 | 6/2007 | Nicodemus et al. |
| 2008/0005609 | A1 | 1/2008 | Zimmer et al. |
| 2009/0006920 | A1 | 1/2009 | Munson et al. |
| 2009/0070649 | A1 | 3/2009 | Aldana et al. |
| 2009/0271681 | A1 | 10/2009 | Piret et al. |

OTHER PUBLICATIONS

Kevin, "Kevin's FAQ Page" Oct. 2, 2006, University of Waterloo, p. 1-16.*

Digital, "DECnet-Plus for OpenVMS Network Management", Feb. 12, 1996, Digital Equipment Corporation, p. 1-16.*

Tierney, "A monitoring Sensor Management System for Grind Environments", Apr. 28, 2001, Kluwer, p. 1-10.*

Coatley, Susan M., et al. U.S. Appl. No. 11/741,656, filed Apr. 27, 2007, 49 pp., "System and Method for Rapid Identification of Coredump Disks During Simultaneous Take Over".

Harris, Michael David, U.S. Appl. No. 11/789,237, filed Apr. 24, 2007, 72 pp., "Automatic Generation of Core Files and Automatic Generation of Support Information with Generation of Core Files".

Harris, Michael David, U.S. Appl. No. 11/789,185, filed Apr. 24, 2007, 55 pp., "Non-Disruptive Generation of Core Files Without Reboot".

Insley, Mark W., et al., U.S. Appl. No. 11/074,229, filed Mar. 4, 2005, 34 pp., "Configuring A Remote Management Module in a Processing System".

Insley, Mark W., et al., U.S. Appl. No. 11/073,260, filed Mar. 4, 2005, 40 pp., "Method an Apparatus for Boot Image Selection and Recovery Via A Remote Management Module".

Yee, Steven D., et al., U.S. Appl. No. 11/258,628, filed Oct. 25, 2005, 48 pp., "Method and Apparatus for Management and Troubleshooting of a Processing System".

Eigen, David J., et al., U.S. Appl. No. 11/746,873, filed May 10, 2007, 40 pp., "Method and Apparatus for Generating Dynamic Microcores".

* cited by examiner

AUTOMATIC CORE FILE UPLOAD

TECHNICAL FIELD

Embodiments of the present invention relate to remote support for a processing system and, in particular, to automating remote support for a storage server.

RELATED APPLICATIONS

The present invention is related to U.S. patent application Ser. No. 12/074,222, filed Feb. 29, 2008, and U.S. patent application Ser. No. 12/112,564, filed Apr. 30, 2008, which are assigned to the same assignee as the present application.

BACKGROUND

In many types of computer networks, it is desirable to be able to perform certain management related functions (e.g., configuring, performing diagnostic functions, debugging, software upgrades, etc.) on a computer or other form of processing system from a remote location. One important management function is troubleshooting the processing system to prevent errors and/or fix errors that have occurred.

One particular application in which it is desirable to have this capability is in a storage-oriented network, i.e., a network that includes one or more storage servers that store and retrieve data on behalf of one or more storage clients. A storage server runs an operating system that is susceptible to a number of fatal errors from which it cannot safely recover. One common error is a memory violation where the operating system attempts to read an invalid or non-permitted memory address. Hardware failures or other software failures may also occur. When the operating system detects an internal fatal error it may initiate an action known as a kernel panic.

During a kernel panic, a snapshot of the system's memory may be dumped (core dump) into a core file. A core file is a diagnostic aid used by support engineers to help diagnose and fix system problems. A core file is usually sent to a system support center (e.g., a support enterprise) by manually uploading it to the support center. However, core files may be large (e.g., 12 gb) in size, and because they are typically transferred using secure methods, it often takes a significant amount of time (e.g., up to two-days) to upload a complete core file to the support center. During a core upload, if a problem arose that stopped the transmission of the core file, the process may need to be restarted from the beginning, which adds to the overall transfer time.

Getting a core file to a support center as quickly as possible, so that support engineers can begin diagnosing and fixing a problem, is often extremely important for continued operations. Traditionally, upon receiving notice of a panic, the support center must contact the customer with the storage server onsite and request that they retrieve and upload a core file from the storage server. This manual process introduces a significant delay involved with engaging a customer contact.

Additionally, the manual process requires the customer to upload the core file via ftp, http and https which are simple protocols that do not offer resiliency. In the event that the customer loses connectivity, the core file upload would need to be manually reinitiated without a guarantee that it can be resumed from the last uploaded portion of the core. The size of core files adds to the probability that the transfer will be interrupted.

SUMMARY

A support center receives an error message from a remote storage system indicating that an error, such as a kernel panic, has occurred on the remote storage system. The error message is processed to determine the type of error, whether the type of error is known and whether a solution is known for the type of error. If the type of error is unknown, a core file upload request is automatically generated and sent to the remote storage system.

BRIEF DESCRIPTION OF THE DRAWINGS

The present invention is illustrated by way of example, and not by way of limitation, in the figures of the accompanying drawings.

DETAILED DESCRIPTION

Embodiments are described that automatically request a core file upload. In one embodiment, a support center receives an error message from a remote storage system indicating that an error, such as a kernel panic, has occurred on the remote storage system. A case creation module at the support center parses the error message to determine the type of error that occurred and an error type analysis module determines whether the type of error is known. If the type of error is unknown, a core file upload request is automatically generated and sent to the remote storage system.

Figure 1:
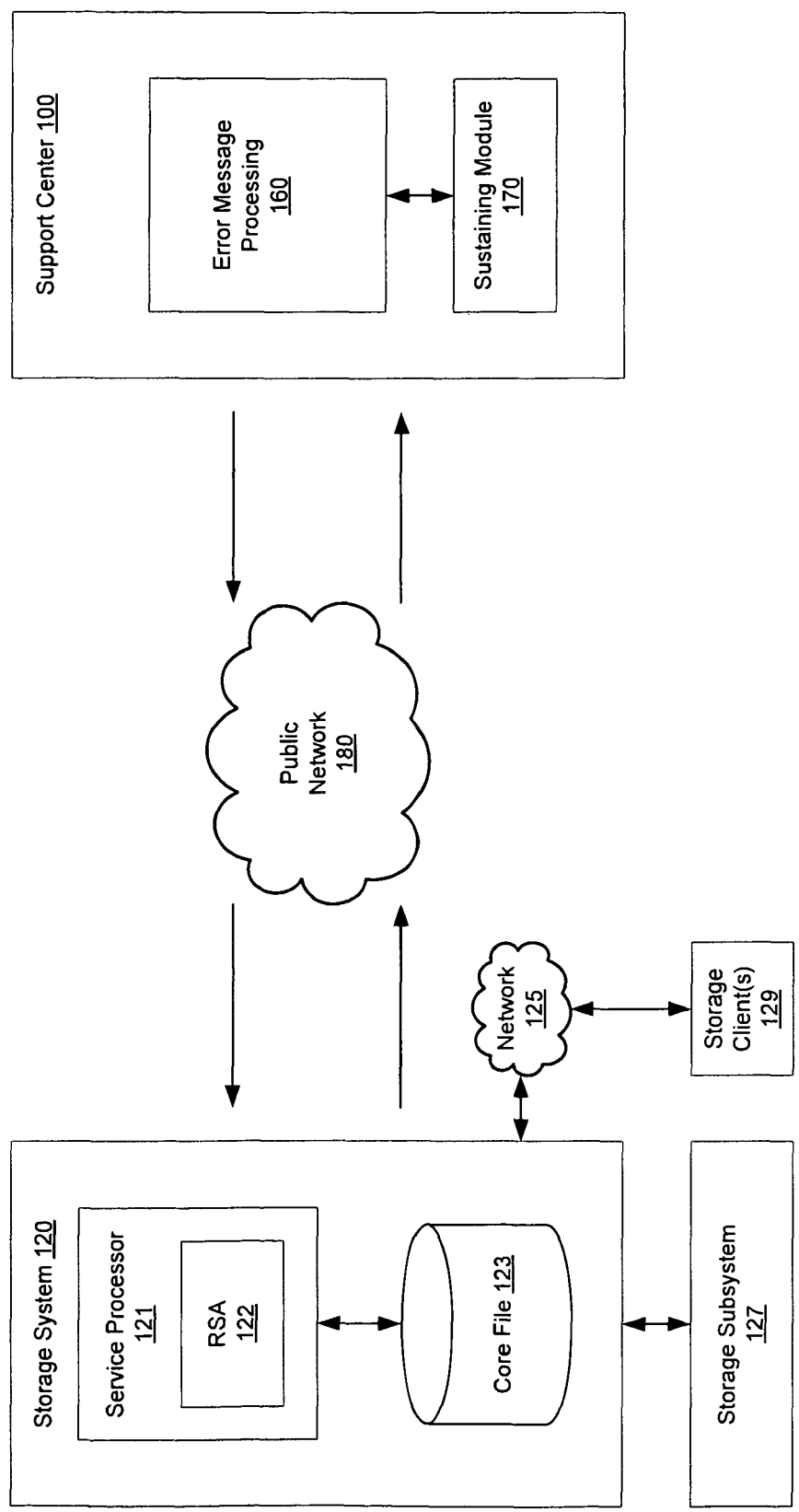
FIG. 1 illustrates an exemplary network architecture, in which an embodiment of the present invention can operate.

FIG. 1 illustrates one embodiment of support center 100 configured to communicate with a remote customer system. In this embodiment, the remote customer system includes remote storage system 120 connected with a storage subsystem 127, which may include a set of mass storage devices managed by storage system 120, and further connected with one or more storage clients 129 via a network 125. The remote storage system 120 communicates with support center 100 via a public network 180. Public network 180 may be the Internet or any other communication network. In one embodiment, Hypertext Transfer Protocol over Secure Socket Layer (HTTPS) is implemented in such communication. The remote storage system 120 uses a service processor 121 to communicate with an error message processing module 160 in support center 100 in order to create a secure connection. The service processor 121 contains a remote support agent (RSA) module 122 that is configured to automatically send information to and receive information from the error message processing module 160. That is, the RSA module 122 is a program that can automatically diagnose and act upon the remote storage system 120 and interactively communicate with the error message processing module 160. In this way, the error message processing module 160 can automatically support the remote storage system 120 on an as-needed basis.

In one example, if a core file 123 is created, the RSA module 122 retrieves the core file 123 and automatically notifies the error message processing module 160 that a core file has been created. The error message processing module 160 then issues a "send core file" command to the RSA module 122, which securely sends the core file over public network 180 to the support center 100. At the support center 100, the error message processing module 160 receives the incoming core file 123 and transfers it to another module, such as Sustaining module 170 for use in conducting a diagnostic. This process will be described further below.

It will be appreciated that while certain modules in the support center 100 may be configured to perform some automatic diagnostics on the core file, support engineers may also need to review the file for a more detailed analysis. It will also be appreciated that the RSA module 122 may be located on a service processor module (e.g., a communications card) of the remote storage system 120, and the RSA 122 may include computer programming code within an operating system, for example, configured to act as an agent for the error message processing module 160 in the remote storage system 120, and to communicate with the error message processing module 160. It will be further appreciated that RSA module 122 may be implemented in hardware, firmware and/or software, and may be located in/on a variety of components of the remote system, such as within different applications and/or in different layers of an operating system, for example.

In one embodiment, a core file includes a number (e.g., hundreds or thousands) of compressed "chunks" that are individually collected by a remote support agent and separately and securely sent from the remote storage system 120 to support center 100. The sending of the individual core file "chunks" is monitored for problems by the remote storage system and the support center, such that both the remote storage system and the support center agree that a "chunk" of the core file is received by the support center. The support center may send a message to the remote storage system indicating whether or not the chunk was successfully received. If a problem occurs during transmission, the monitoring detects the interruption, and begins resending the core file. The resending starts by sending the core file chunk that comes after the last core file chunk that was fully received by the support enterprise. In this manner, only a part of the core file that had not been successfully sent is resent, instead of the entire file. Due to the potentially large size of the core file, this resiliency can save considerable time and resources.

Figure 2:
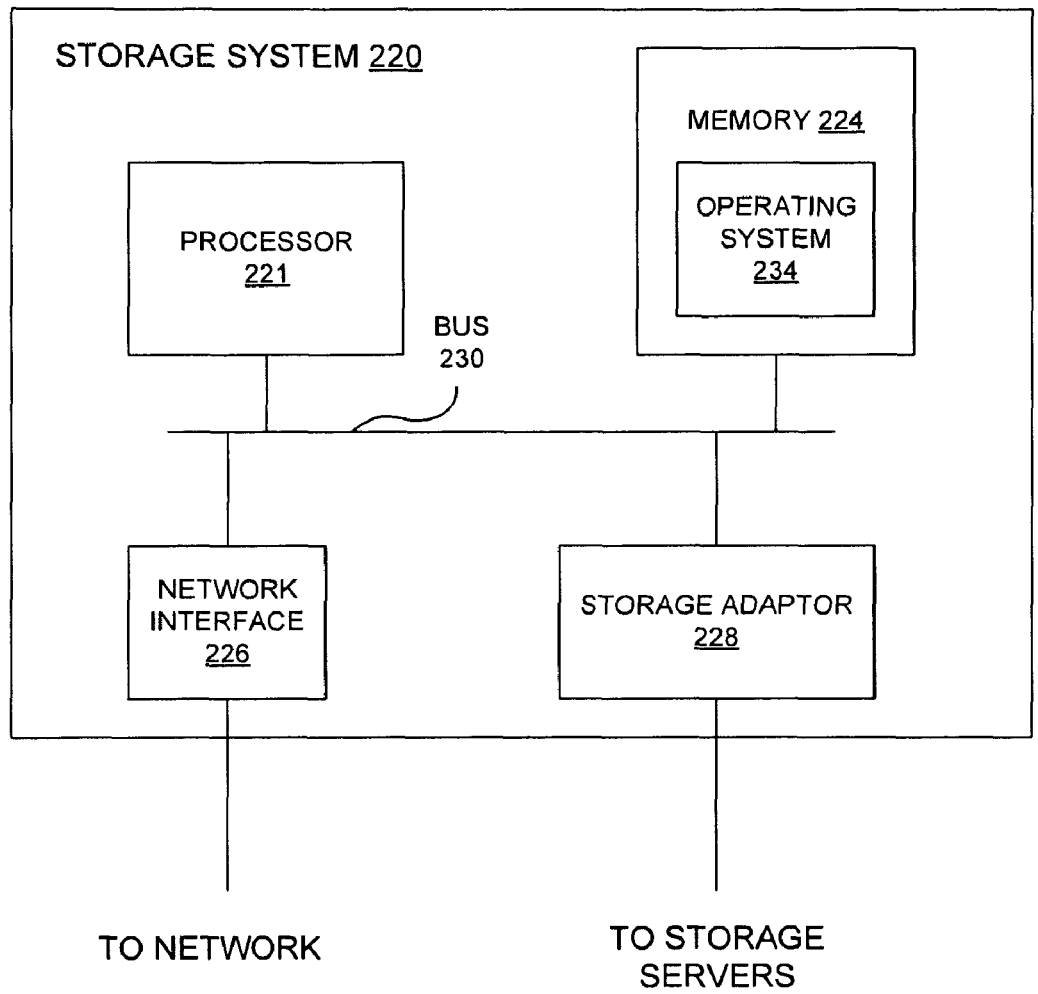
FIG. 2 illustrates one embodiment of a storage system.

One embodiment of the remote storage system 120 may be implemented as illustrated in FIG. 2. Referring to FIG. 2, in this embodiment, the storage system 220 includes a processor 221, a memory 224, a network interface 226, and a storage adaptor 228, which are coupled to each other via a bus system 230. The bus system 230 may include one or more busses and/or interconnects. The storage manager 220 communicates with a network via the network interface 226, which may be an Ethernet adaptor, fiber channel adaptor, etc. The network interface 226 may be coupled to a public network, a private network, or a combination of both in order to communicate with a client machine (such as Storage Client 129 in FIG. 1) usable by an administrator of the remote data storage system.

In one embodiment, the processor 221 reads instructions from the memory 224 and executes the instructions. The memory 224 may include any of various types of memory devices, such as, for example, random access memory (RAM), read-only memory (ROM), flash memory, one or more mass storage devices (e.g., disks), etc. The memory 224 stores instructions of an operating system 234. The processor 221 retrieves the instructions from the memory 224 to run the operating system 234. The storage manager 220 interfaces with one or more storage systems (such as Storage Subsystem 127 in FIG. 1) via the storage adaptor 228, which may include a small computer system interface (SCSI) adaptor, fiber channel adaptor, etc.

Figure 3:
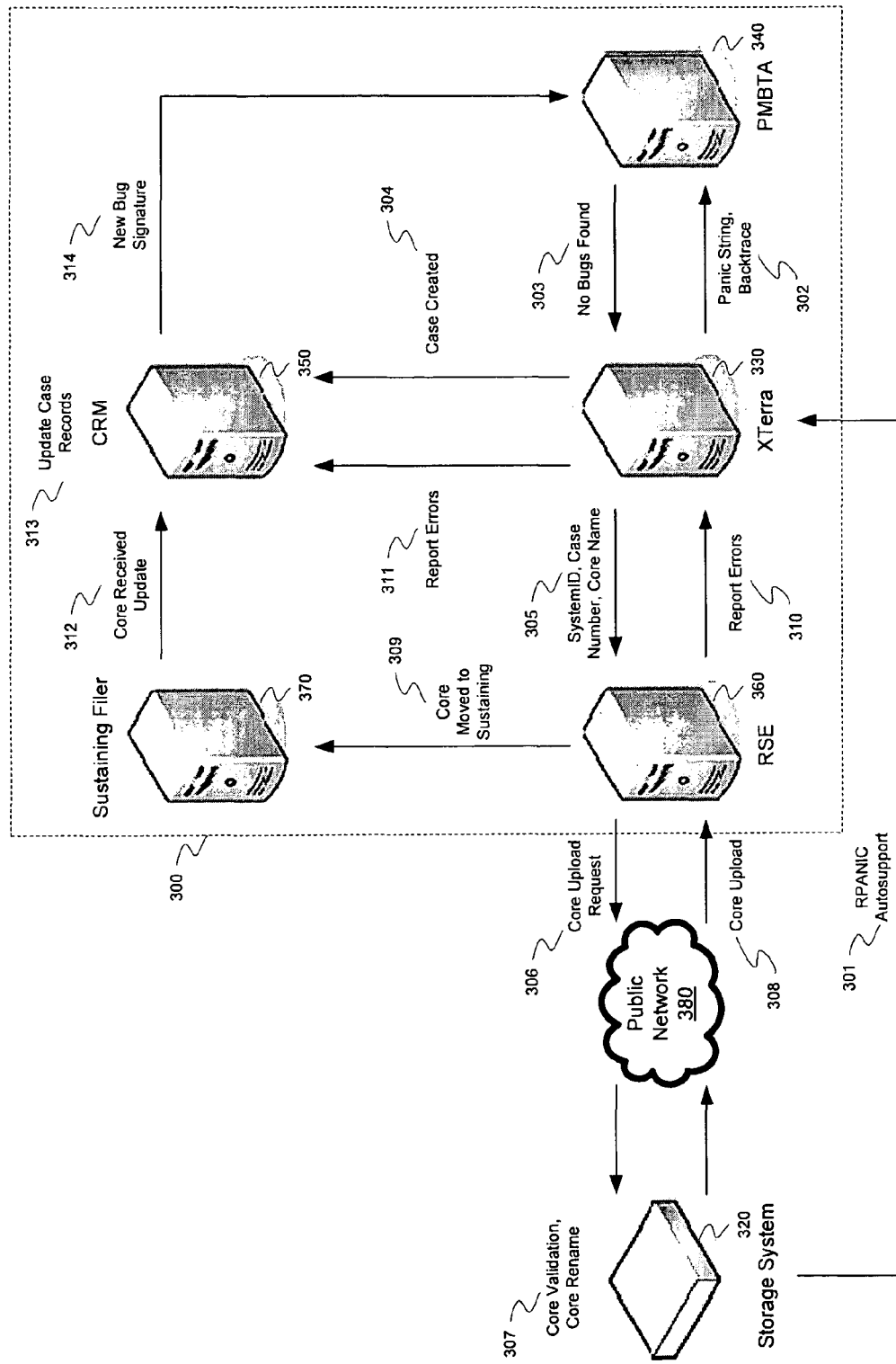
FIG. 3 illustrates an exemplary support center system architecture that can perform an automatic core upload according to one embodiment of the present invention.

FIG. 3 illustrates an exemplary support center architecture 300 that provides an automatic core upload according to one embodiment of the present invention. Support center architecture 300 represents one embodiment of the error message processing module 160 of FIG. 1. It will be appreciated that in one embodiment support center architecture 300 includes a single system with one or more modules contained therein. In alternative embodiments, support center architecture 300 includes one or more individual systems, where some or all functions are performed by separate systems. As discussed above, a storage system 320 initiates a panic if an unrecoverable error occurs. Upon recovery from the panic, the storage system 320 sends an error message to the support center 300. In one embodiment, the error message is an AutoSupport message, such as restartable panic (RPANIC) AutoSupport 301. In one embodiment, the AutoSupport message (ASUP), is sent via email or Hypertext Transport Protocol (HTTP) or Hypertext Transport Protocol (Secure) (HTTPS). The ASUP may include data associated with the health of the storage system, data associated with any problems detected by the storage system, and additional data. Commonly, ASUPs include a full range of data to facilitate troubleshooting a current or pending problem. For example, ASUPs may include all diagnostic logs available to the storage system. Storage system 320 may issue an ASUP when an application or system crash is detected, on receipt of a command from the support sever requesting an ASUP, or according to other criteria. In one embodiment, the error message is received by a case creation application, such as XTerra 330. Case creation application 330 parses the received error message to extract the relevant information to determine the type of error that occurred. With the extracted information, case creation application 130 creates a case record 304 in a customer relationship manager (CRM) module 350. The case record may be a file, indicating, among other information, the customer name, the storage system name and the type of error that occurred.

Case creation application 330 also takes the extracted information from the received error message and passes information about the error, such as Panic String and Backtrace 302, to an error type analysis module, such as Panic Message and Backtrace Anaylyzer (PMBTA) module 340. PMBTA 340 contains a database of every known panic string and backtrace as well as the solution for those known errors. PMBTA 340 compares the received panic message and backtrace 302 to the database and determines whether the type of error is a known type of error and whether a fix for the current error is known. If the error is in the database and a fix has been previously developed, PMBTA 340 sends the fix back to case creation application 330 for transmission to the customer 320. If the error is found in the database but no known solution exists, the customer can be added to a list of clients awaiting the fix and will be notified when a solution becomes available. If the error is not found in the database, it is considered an unknown error and PMBTA 340 sends a message 303 to case creation application 330, indicating that the error was not found.

If the error was not found in PMBTA 340, further analysis may be required to determine the cause of the error and to develop a solution. In this case, case creation application 330 sends a request 305 for the core file from the panicked storage system to a remote support enterprise (RSE) module 360. The panicked storage system may have suffered a fatal error from which it cannot safely recover. One common error is a memory violation where the operating system attempts to read an invalid or non-permitted memory address. Hardware failures or other software failures may also cause a panic. The core file request 305 may contain, for example, among other information, a system identification number, model number, a case number and a core name. In one embodiment, the RSE 360 automatically (i.e., without requiring any instructions from a user) provides the core upload request 306 to the remote customer storage system 320. The RSE 360 may communicate with the storage system 320 over a public network 380, such as the Internet.

The core upload request is received at the storage system by a remote support agent (RSA), such as RSA 122 discussed above with respect to FIG. 2. The RSA then performs process 307 prior to uploading the requested core file. In one embodiment process 307 is a two-step process. First, the RSA performs a sanity validation on the requested core file. The sanity validation ensures that the requested core file has not been corrupted. Second, the RSA renames the requested core file. In one embodiment, the RSA renames the core file by prepending the case ID number received from RSE 360 in the core upload request 306 to the current core file name. In alternative embodiments, process 307 may be completed in a single step. After process 307 has been completed the RSA uploads 308 the requested core file to support center 300 via public network 380.

The requested core file is received at support center 300 by the RSE 360. After the entire core file has been received by the RSE 360, the core file is transferred 309 to a core file analysis module, such as Sustaining Filer 370. If there is an error during the core upload 308, the RSE 360 sends an error message 310 to case creation application 330. Case creation application 330 then updates the case information by reporting the error 311 to the CRM 350.

For a successfully received core file, Sustaining Filer 370 analyzes the core file by performing certain diagnostics to ascertain the cause of the kernel panic. Support engineers may also perform diagnostics on the core file once it has been received by the core file analysis module. After the diagnostics have been completed, Sustaining Filer 370 sends a core received update 312 to the CRM 350. This update 312 causes the CRM 350 to update the case records 313 indicating that the core file has been received and analyzed and that a solution to the error has been found. The CRM 350 then updates PMBTA 340 with the new bug signature 314. The bug signature may contain information regarding the error so that if a subsequent kernel panic error message is received for the same error, the system can send the fix to the remote customer storage system without having to request a full core upload.

Figure 4:
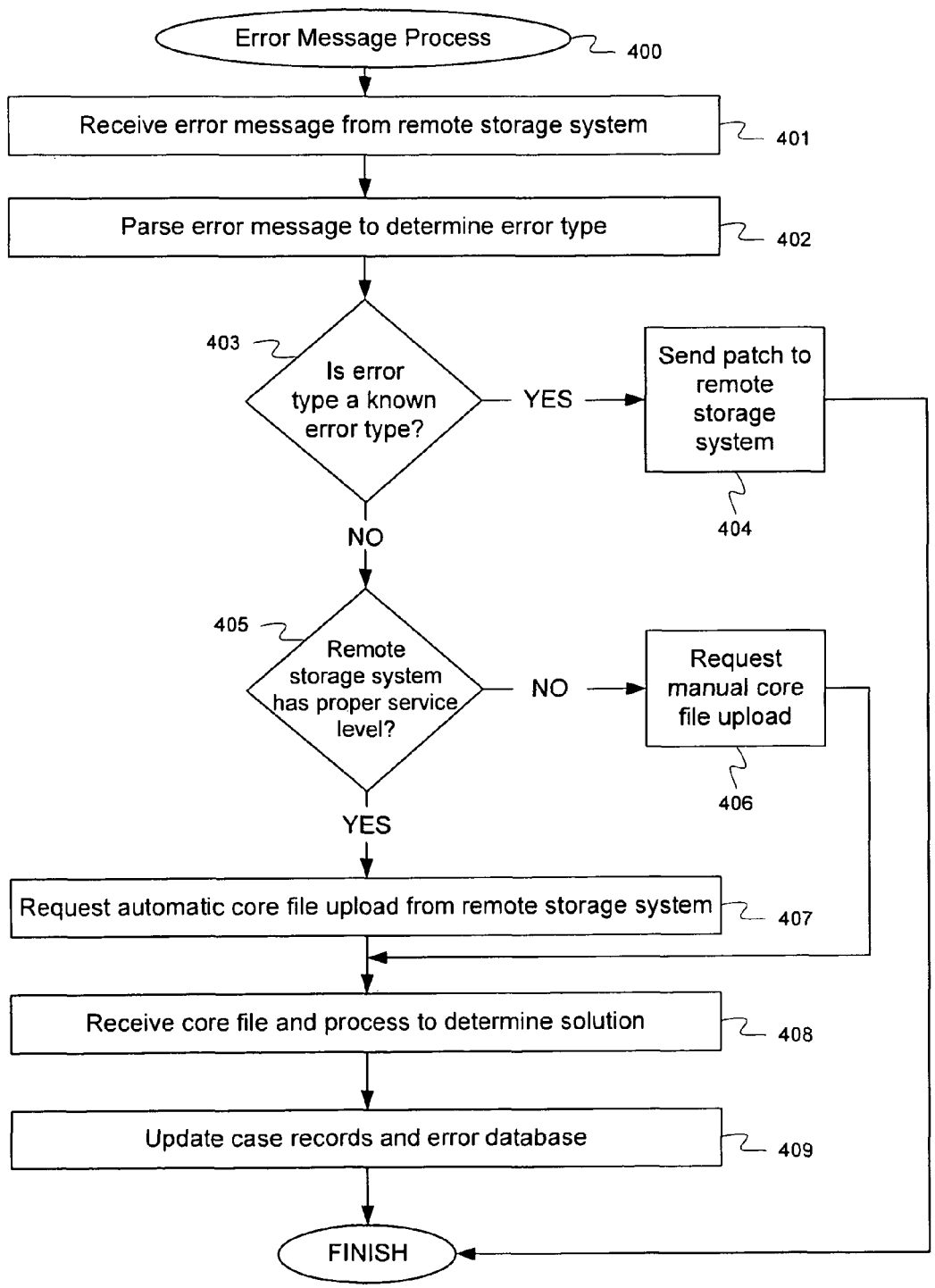
FIG. 4 is a flow diagram illustrating one embodiment of error message processing.

FIG. 4 is a flow diagram illustrating one embodiment of error message processing. The process 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, process 400 is performed by error message processing module 160 of FIG. 1.

Referring to FIG. 4, error message process 400 includes processing logic to enable processing of an error message received from a remote storage system such as storage system 120 of FIG. 1. At block 401, process 400 receives an error message from the remote storage system. The error message indicates that an error has occurred on the remote storage system, such as a kernel panic that was initiated in response to an internal fatal error. At block 402, process 400 parses the received error message is to determine the type of error that occurred. A kernel panic on the remote storage system may be the result of several possible internal errors. The error message indicates the cause of the error and provides that information to the error message processing module.

At block 403, process 400 determines whether the type of error parsed at block 402 is a known type of error (i.e. part of a previously received error message from this or another storage system). The error message processing module includes a database of errors that have been previously encountered as well as a solution or patch to solve the problem and prevent the error from occurring again. If a search of the database reveals that the type of error in the error message received at block 401 is known, process 400 proceeds to block 404. At block 404, process 400 sends the patch for the known solution to the remote storage system. After the patch is sent and successfully received by the remote storage system, process 400 ends.

If a search of the database reveals that the type of error is unknown, further processing is required. At block 405, process 400 verifies the service level of the remote storage system. Customer information stored by the error message processing module includes the level of service to which the customer is entitled. The service level may include entitlement information allowing access to automatic core upload procedures. If the remote customer storage system does not have the proper entitlement information to enable automatic core upload, a manual core upload request must be made. At block 406, a manual core upload request is made. The manual core upload request may include a support engineer contacting the customer with the storage system onsite and requesting that the customer retrieve and upload a core file from the storage system. After the manual core file upload request is sent, process 400 continues to block 408.

If the remote customer storage system does have the proper entitlement information to enable automatic core upload, process 400 continues to block 407. At block 407, process 400 automatically generates a core file upload request and sends the request to the remote storage system. The core file upload request may contain, among other information, a system identification number, model number, a case number and a core name. The request is sent to a remote support agent located on the remote storage system, which can upload the requested core file back to the error message processing module.

At block 408, process 400 receives the requested core file from the remote storage system. The core file is processed to determine a solution for the error that caused the kernel panic. The core file processing may be done using automated techniques, manually by a support engineer or through a combination of automated and manual steps.

At block 409, process 400 updates various records. In one embodiment, case records are updated to indicate that the error in the received core file was successfully diagnosed and resolved. Additionally, the database of known errors is updated to indicate that the particular error has been seen before and that a solution has been developed. If a subsequent kernel panic error message is received for that same error, the system can then send the fix to the remote customer storage system without having to request a full core upload. After the case records and error database have been updated, process 400 ends.

The description above sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

Embodiments of the present invention include various operations, which were described above. These operations may be performed by hardware components, software, firmware, or a combination thereof.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical; or another type of medium suitable for storing electronic instructions.

Additionally, some embodiments may be practiced in distributed computing environments where the machine-readable medium is stored on and/or executed by more than one computer system. For example, the storage system may include a separate N-blade (network) and D-blade (disk). In such an embodiment, the N-blade is used to communicate with clients, while the D-blade includes the file system functionality and is used to communicate with the storage subsystem. The N-blade and D-blade communicate with each other using an internal protocol. Alternatively, the storage system may have an integrated architecture, where the network and data components are all contained in a single box. The storage system further may be coupled through a switching fabric to other similar storage systems which have their own local storage subsystems. In this way, all of the storage subsystems can form a single storage pool, to which any client of any of the storage systems has access. In addition, the information transferred between computer systems may either be pulled or pushed across the communication medium connecting the computer systems.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A computer implemented method comprising:
receiving, by a processor, an error message from a remote storage system in which an error occurred;
parsing the error message to determine a type of error and creating a case number for the error;
determining whether the type of error is known; and
if the type of error is unknown, sending a core upload request with the case number to the remote storage system to automatically request that a core file be sent from the remote storage system, wherein the core file is validated by the remote storage system and is renamed by the remote storage system to incorporate the case number into an existing core file name.

2. The method of claim 1, wherein the core upload request comprises a system identification number, the case number and a core name.

3. The method of claim 1, further comprising:
verifying a service level of the remote storage system by checking entitlement information.

4. The method of claim 1, further comprising:
receiving the core file from the remote storage system; and
processing the core file to determine a cause of an error contained in the received core file and a solution for the error.

5. The method of claim 4, further comprising:
if a transmission error occurs while receiving the core file, receiving an error message indicating the transmission error.

6. The method of claim 4, further comprising:
updating a list of known errors with the solution for the error contained in the received core file.

7. A system, comprising:
a processor coupled to a memory, the memory storing
a case creation module to cause the processor to receive an error message in response to a storage system error from a remote storage system in which an error occurred, process the error message to determine an error type and create a case number for the storage system error, and
a remote support enterprise (RSE) module to cause the processor to automatically send a core file upload request with the case number to the remote storage system in response to the received error message, wherein the core file is validated by the remote storage system and is renamed by the remote storage system to incorporate the case number into an existing core file name.

8. The system of claim 7, wherein the core file upload request comprises a system identification number, the case number and a core name.

9. The system of claim 7, wherein the RSE module is configured to receive the core file from the remote storage system.

10. The system of claim 7, the memory further storing an error type analysis module to cause the processor to determine whether the error type is known.

11. The system of claim 10, the memory further storing a customer relationship manager (CRM) module to cause the processor to maintain a case record for the storage system error.

12. The system of claim 11, the memory further storing a core file analysis module to cause the processor to process the received core file and determine a solution for the storage system error.

13. The system of claim 12 wherein the core file analysis module updates the CRM module once the solution has been determined and the CRM module updates a list of known errors in the error type analysis module.

14. A system, comprising:
a processor unit; and
a memory storing instructions which, when executed by the processor unit, cause the system to
receive an error message from a remote storage system in which an error occurred,
parse the error message to determine a type of error and create a case number for the error,
determine whether the type of error is known, and
if the type of error is unknown, sending a core upload request with the case number to the remote storage system to automatically request that a core file be sent from the remote storage system, wherein the core file is validated by the remote storage system and is renamed by the remote storage system to incorporate the case number into an existing core file name.

15. The system of claim 14, wherein the core upload request comprises a system identification number, the case number and a core name.

16. The system of claim 14, the instructions further to cause the system to verify a service level of the remote storage system by checking entitlement information.

17. The system of claim 14, the instructions further to cause the system to receive the core file from the remote storage system and process the core file to determine a cause of an error contained in the received core file and a solution for the error.

18. The system of claim 17, the instructions further to cause the system to update a list of known errors with the solution for the error.

19. The system of claim 14, the instructions further to cause the system to determine if a transmission error occurs while receiving the core file and receive an error message indicating the transmission error.

20. The system of claim 14, the instructions further to cause the system to maintain a case record for the received error message.

21. A method to automatically request a core file upload for execution by a support center system, the method comprising:
receiving an error message from a remote storage system in which an error occurred at a case creation module of the support center system;
parsing the error message to determine a type of error and creating a case number for the error by the case creation module;
determining whether the type of error is known by an error type analysis module of the support center system; and
if the type of error is unknown, sending a core upload request with the case number from a remote support enterprise (RSE) module of the support center system to the remote storage system to automatically request that a core file be sent from the remote storage system to the support center system, wherein the core file is validated by the remote storage system and is renamed by the remote storage system to incorporate the case number into an existing core file name.

* * * * *

UNITED STATES PATENT AND TRADEMARK OFFICE
CERTIFICATE OF CORRECTION

PATENT NO.       : 8,086,909 B1                                                        Page 1 of 1
APPLICATION NO.  : 12/265362
DATED            : December 27, 2011
INVENTOR(S)      : Liu et al.

It is certified that error appears in the above-identified patent and that said Letters Patent is hereby corrected as shown below:

On the Title Page
Item (75) delete "Pradeep Kaira" and insert -- Pradeep Kalra --.

Signed and Sealed this
Twenty-fifth Day of February, 2014

Michelle K. Lee
*Deputy Director of the United States Patent and Trademark Office*